Jan. 15, 1952 A. A. McVICKER ET AL Re. 23,450
MACHINES FOR PRODUCING PADS FOR JOURNAL LUBRICATION
Original Filed Dec. 20, 1945 2 SHEETS--SHEET 1
Fig. 1
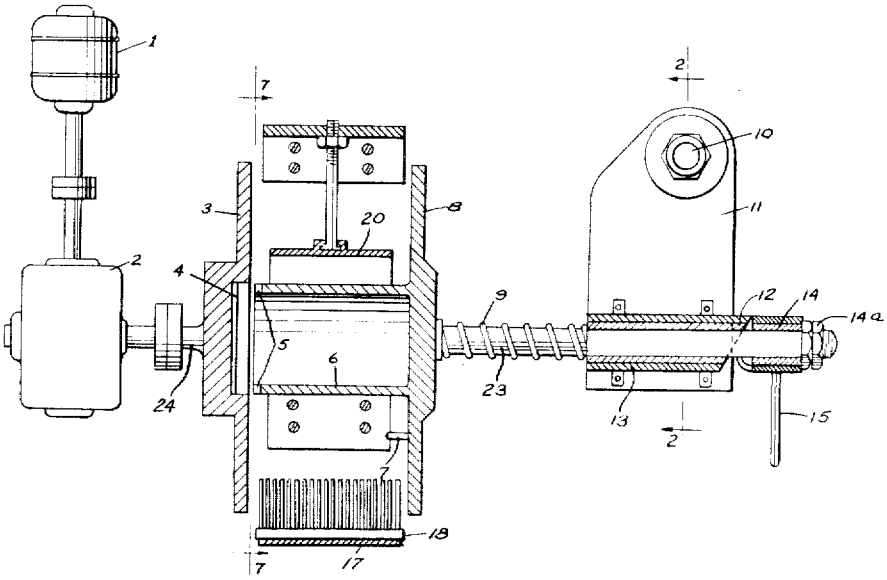
Fig. 2
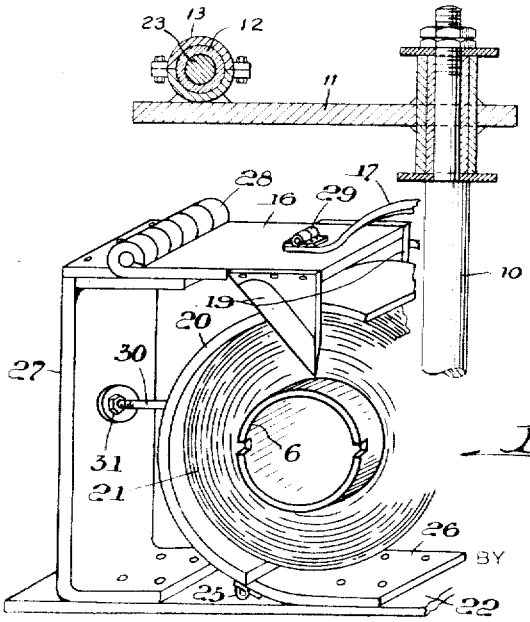
Fig. 3
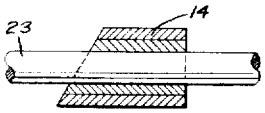
Fig. 8.
INVENTORS
Howard D. McVicker
Ansley A. McVicker
BY Christy, Parmelee and Strickland
ATTORNEYS.

MACHINES FOR PRODUCING PADS FOR JOURNAL LUBRICATION

Original Filed Dec. 20, 1945 2 SHEETS—SHEET 2

INVENTORS
Howard D. McVicker
Ansley A. McVicker
BY Christy, Parmelee and Strickland
ATTORNEYS.

Reissued Jan. 15, 1952

Re. 23,450

UNITED STATES PATENT OFFICE 23,450

MACHINE FOR PRODUCING PADS FOR JOURNAL LUBRICATION

Ansley A. McVicker, Jeannette, and Howard D. McVicker, Latrobe, Pa.

Original No. 2,485,901, dated October 25, 1949, Serial No. 636,166, December 20, 1945. Application for reissue August 22, 1951, Serial No. 243,119

18 Claims. (Cl. 19—149)

Matter enclosed in heavy brackets [ ] appears in the original patent but forms no part of this reissue specification; matter printed in italics indicates the additions made by reissue.

This invention relates to the production of roll-type pads from waste fibre material and, more particularly, to a machine for producing roll-type pads such as are employed in the lubrication of friction-type bearings in railroad rolling stock.

We are aware that prior to our invention roll-type pads have been made by hand by feeding waste material onto a spool with an oblong mandrel (oblong in the circumferential or transverse direction) while this spool was intermittently revolved by hand between hand-smoothing and brushing operation.

One of the objects of the present invention is to provide a semi-automatic machine which is capable of producing such roll-type pads.

Another object of the invention is the production of roll-type pads having uniform dimensions and properties.

Another object of the invention is the provision of a machine for the production of roll-type pads for journal box lubrication at a much lower cost than has been possible heretofore.

A further object of the invention is to eliminate or greatly reduce the loss of the raw product which occurs in the practice of present manufacturing methods.

The invention further contemplates a machine capable of producing a roll-type pad of uniform thickness and width over its entire length.

All of these and other objects which will later appear may be more clearly understood by reference to the accompanying drawings, in which:

Figure 1 is a horizontal sectional view of the machine;

Figure 2 is a sectional view taken along the line 2—2 in Figure 1;

Figure 4:
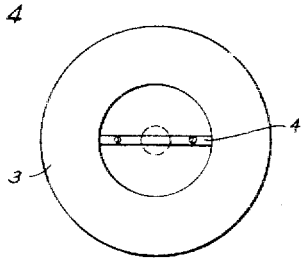
Figure 5:
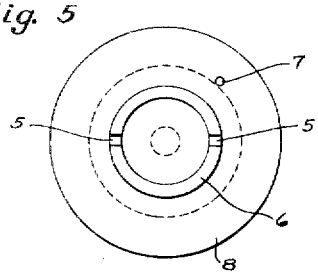
Figure 6:
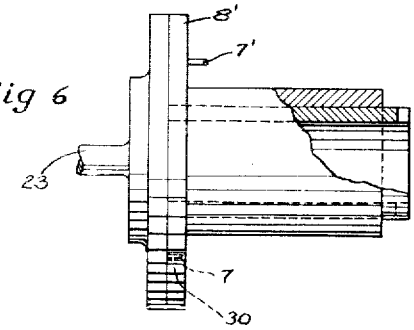
Figure 7:
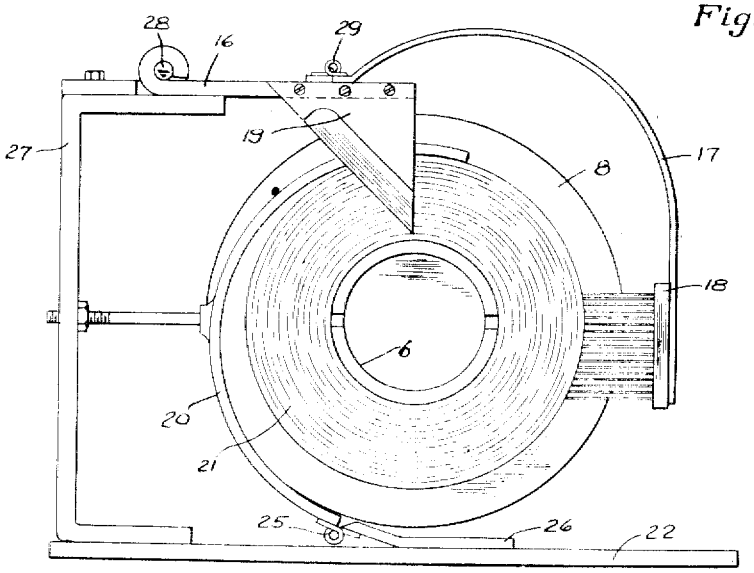

Figures 3, 4, and 5 are detailed views as described hereinbelow;

Figure 6 is a view of an adapter sleeve and end-plate assembly, partly in elevation and partially broken to disclose details of construction;

Figure 7 is a sectional view of the machine taken along the line 7—7 of Figure 1.

*Figure 8 is a perspective view of the portion of the pad-making machine shown in Figure 7.*

By the term "waste" as used herein is meant journal box packing material, usually prepared of wool and/or cotton threads of any specified size mixed in loose form in any proportions. The function of this waste is to act as a holding agent for lubricating oil and as a wick to carry the oil to the bearing surface of the axle against which it presses.

Turning now to the drawings, the various elements of the machine are mounted on a base 22, as seen in Figure 7. Mounted on the base is a shaft 10 (Figure 1), which supports a bearing mounting plate 11, which in turn supports a journal assembly comprising members 12 and 13. Another shaft 23, is supported in the journal and is connected at one end with the mandrel end *or side* plate 8, to which in turn is secured the mandrel 6. The opposite end of the mandrel is supplied with slots 5, which are adapted to engage with the key 4 on the end plate 3, which is secured to the drive shaft 24. The drive shaft is driven by the motor 1 through reduction gearing in the box 2. The tapered cam 14 is mounted for rotation on the shaft 23 and is provided with a lever 15 for effecting rotation thereof. [Axial movement of the cam 14 is transmitted to shaft 23 through a nut 14a threaded on shaft 23.] It will be noted that the adjacent faces of the journal 12 and the cam 14 are tapered (see Figures 1 and 3), whereby rotation of the cam by means of the lever 15 *causes the cam to move axially and* increases the separation of the journal 12 and the cam 14, compressing spring 9, and moving the mandrel from engagement with the end plate 3. *Axial movement of the cam 14 is transmitted to shaft 23 through a nut 14a threaded on shaft 23.*

Turning again to Figure 7, the deflector plate 20 is hinged at 25 to mounting plate 26. *The plate 20 is adjustable by means of a bolt 30 and nut 31 to have its underface at the top thereof engage the waste of the pad when the waste has been built up on the mandrel 6 to the desired depth.* Knives 19 are rigidly fastened to arm 16 which is hinged to support 27 at 28. Brush 18 is supported by arm 17 which is hinged to arm 16 at 29.

With the motor 1 in operation, bearing plate 11, journal 12, shaft 23, and mandrel 6 are swung to a position in which the axis of the mandrel is in alignment with the axis of end plate 3. Cam 14 is then rotated, releasing spring 9 which forces mandrel 6 into engagement with end plate 3. As seen in Figure 4, the end plate 3 is provided with a key 4 which is adapted to engage with the slots 5 in mandrel 6 as shown in Figure 5.

Waste material is now fed to the bottom of the mandrel, the first material being caught on a pin 7 to act as a starting base. When the proper amount of waste 21 has been fed onto the mandrel, arms 16 and 17 are swung down into position so that the knives 19 trim the edges of the roll while the brush 18 combs the top layers of waste in a regular circumferential direction with the individual threads lying parallel to each other. Without stopping the motor, lever 15 is actuated, compressing the spring 9 by the action of cam 14, and disengaging the slots 5 in the mandrel 6 from the key 4 on the end plate 3.

The entire unit, comprising the mandrel, shaft, and bearing, is then pivoted about shaft 10, and the finished pad is slipped off the mandrel. In preparation for the next operation, the mandrel and shaft are returned to alignment with the end plate 3 and the spring released.

To adapt the roll as a pad for lubricating purposes, it is merely flattened. From here, the usual saturation and insertion methods are followed.

In order to permit the machine to be used in the fabrication of pads of various sizes, the mandrel 6 is made with an outside diameter comparable to the bore of the smallest rolls to be manufactured, and of a length comparable to the widest pads to be made. Other sizes are provided for by placing a bushing over the mandrel 6 and/or by slipping on a plate of the proper thickness and machined with its inside diameter to move freely on the mandrel 6, and with its outside diameter the same as the outside diameter of the end or side plate 8; or a complete unit, as disclosed in Figure 6, and having an end plate and a bushing, is slid over the mandrel. Variations in the dimensions of the outside diameter of the roll are provided for by the adjustable, flexible deflection plate 20.

It will be noted from the drawings that the adapter end plate 8′ is provided with an aperture 30 adapted to enclose pin 7, whereby the adapter is keyed to the mandrel. End plate 8′ is further provided with pin 7′ which, when the adapter is in place, replaces pin 7 in providing a means for initiating the formation of the roll.

Among the advantages of the invention is increased production and standardization of the product as compared with the hand methods which have heretofore been practiced.

A further advantage of the invention is the utilization of a very high percentage of all acceptable raw material, and it also eliminates or vastly decreases the amount of raw material lost through inefficient or careless operation of the present hand-manipulated machines.

A further advantage of the invention resides in the employment of a round mandrel instead of the oblong mandrel now in use, which produces a roll of uniform thickness between the inner and outer diameters, as opposed to the conventional roll in which the fabrics tend to pull "thin" at the ends of the oblong mandrel during the building up of the roll.

The invention also insures the production of a pad that is of uniform size and density over its entire length.

The machine further produces a product that eliminates the "waste grabs" which are experienced with loose packing or hand-made rolls.

We claim:

1. A machine for the production of roll-type pads from waste material, comprising a shaft journalled in a bearing, the bearing being mounted for pivotal movement on an axis *positioned* at a substantial [angle to] *distance from* the axis of the shaft, a mandrel mounted on the shaft, and drive means for the mandrel, the mandrel being adapted to be detachably connected with the drive means for rotation of the mandrel and the shaft *about the axis of the bearing*.

2. A machine for producing roll-type pads from waste material comprising a shaft, a drive means, a mandrel attached at one end to the shaft and being adapted at the other end to engage the drive means, the shaft being journalled in a bearing and the bearing being mounted for swing motion about an axis *positioned a substantial distance from and* perpendicular to the axis of the shaft, whereby the bearing, shaft, and mandrel may be swung on the said *bearing* axis to bring the said mandrel into axial alignment with the drive means and *away* from alignment therewith.

3. A construction in accordance with claim 2 in which the shaft is adapted for axial movement in the bearing, whereby the mandrel may be moved axially into engagement with the drive means.

4. A construction in accordance with claim 2 [and further having means] *in which a spring is mounted on the shaft between the bearing and the mandrel* for shifting the shaft axially in the bearing whereby the mandrel may be moved axially into engagement with the drive means.

5. A construction in accordance with claim 1 in which the mandrel comprises a cylindrical core portion and an end plate, the diameter of the end plate being substantially greater than the diameter of the core portion, and a pin mounted on the end plate with its axis parallel to the axis of the core portion and disposed outwardly from the core portion in a radial sense.

6. A machine for producing roll-type pads from waste material comprising rotary drive means, a bearing mounted for swing motion on an axis perpendicular to the axis of rotation of the drive means, a shaft journalled in the bearing and adapted for rotation and axial movement in the bearing, a mandrel mounted on an end of the shaft, the mandrel, shaft, and bearing being adapted for swing motion as a unit from a position in which the axes of the shaft and mandrel are aligned with the axis of the drive means, the mandrel being adapted to engage with the drive means at one extreme of the axial movement of the shaft in the bearing, and to be disengaged from the driving means at the other extreme of the axial movement of the shaft in the bearing.

7. A construction in accordance with claim 6 and further having a resilient means disposed between the mandrel and the bearing, and arranged to maintain the mandrel in operative engagement with the drive means, and means for retracting the mandrel and shaft from engagement with the drive means against the compression of the said resilient means and for maintaining the mandrel in the disengaged position.

8. A machine for producing roll-type pads from waste material comprising a rotatable mandrel adapted to receive waste material, roll forming means capable of pressure contact with a portion of the circumferential surface of a roll formed on the mandrel, and mounting means for the mandrel providing for swing motion thereof on an axis offset from its axis of rotation to and from a position in which said means engages the surface of a roll supported on the mandrel.

9. A construction in accordance with claim 8 and further including brush means adapted to contact the circumferential surface of the roll, said brush being mounted for motion away from contact with the surface of the roll in a manner to provide clearance for swing motion of the mandrel.

10. A construction in accordance with claim 8 and further having means for trimming an end of the roll.

11. A machine for producing roll-type pads from waste material comprising a mandrel having a cylindrical core portion and a separable end plate, the said end plate and core portion being provided with interengaging cooperative means whereby the core portion may be rotatively driven by the end plate, and the machine further being provided with means whereby the core portion may be removed from engagement with the end plate, and swung clear thereof on an axis at a substantial angle to the axis of the mandrel.

12. For a machine for producing roll-type pads from waste material comprising a mandrel having a cylindrical core and an end plate, the end plate being provided with a pin parallel to the axis of the core portion mounted outwardly from the core portion in a radial direction; an adapter assembly comprising a sleeve and an end plate adapted to slide over the core portion, the end plate being provided with an aperture adapted to engage the said pin, and the end plate of the adapter further having a pin mounted thereon parallel to the axis of the core, and radially disposed therefrom.

13. A construction in accordance with claim 8 and further including knife means for trimming superfluous material from an end surface of a roll, said means being mounted for oscillatory motion in a plane substantially perpendicular to the axis of the roll.

*14. A machine for production of roll-type pads from waste comprising an end plate connected with a motor and mounted for rotation, a mandrel connected with a shaft mounted adjacent the rotary end plate in axial alignment therewith, a coupling member mounted in the face of the end plate, a coupling member formed on the end of the mandrel, compression spring means for holding the coupling member of the mandrel in engagement with the clutch member of the end plate and means connected with the mandrel shaft constructed and arranged to effect manual disconnection of the mandrel from the end plate while the end plate continues to rotate and a withdrawal of the mandrel a sufficient distance from the end plate to permit removal of waste pads from the mandrel without stopping rotation of the end plate.*

*15. The winding machine defined in claim 14 in which a deflection plate is movably mounted to enter between the end plate and a side plate on the mandrel, said deflection plate being spaced from the winding face of the mandrel and extending across the major portion of the face to secure a proper distribution of waste being wound on the mandrel, the construction and arrangement of the mandrel and its shaft permitting the withdrawal of the mandrel a sufficient distance from the end plate to permit the removal of a completed pad from the mandrel without obstruction by the deflection plate.*

*16. The winding machine defined in claim 15 in which the deflection plate is flexible and adjustable with reference to the winding face of the mandrel to control the winding of the waste pads of different sizes.*

*17. The winding machine defined in claim 14 in which manually controlled means are operative to axially move the shaft and mandrel to place the spring means under compression while disconnecting the mandrel from the end plate and while the end plate continues to rotate.*

*18. A machine for production of roll-type pads from waste comprising an end plate connected with a motor and mounted for rotation, a mandrel mounted on a shaft adjacent the rotary end plate in axial alignment therewith, a coupling member on the face plate and on the mandrel arranged members for connecting the end plate and mandrel for rotation in unison, a side plate connected with the mandrel whereby the end plate and side plate form the ends of a waste roll wound on the mandrel, and an adjustable distribution plate mounted adjacent the winding position of the mandrel and spanning the major portion of the space between the end and side plates and a brush mounted to move down between the end and side plates to arrange the waste threads approximately parallel to the end and side plates.*

ANSLEY A. McVICKER.
HOWARD D. McVICKER.

REFERENCES CITED

The following references are of record in the file of this patent or the original patent:

UNITED STATES PATENTS

| Number | Name | Date |
|---|---|---|
| 6,572 | MacLardy | July 3, 1849 |
| 848,400 | Sandell | Mar. 26, 1907 |
| 1,931,009 | Phelps | Oct. 17, 1933 |
| 2,202,883 | Yoder | June 4, 1940 |
| 2,205,171 | Kile | June 18, 1940 |
| 2,337,112 | King | Dec. 21, 1943 |

Certificate of Correction

Reissue No. 23,450 January 15, 1952

ANSLEY A. McVICKER ET AL.

It is hereby certified that error appears in the printed specification of the above numbered patent requiring correction as follows:

Column 5, line 42, for "*clutch*" read *coupling*;

and that the said Letters Patent should be read as corrected above, so that the same may conform to the record of the case in the Patent Office.

Signed and sealed this 8th day of April, A. D. 1952.

[SEAL]

THOMAS F. MURPHY,
*Assistant Commissioner of Patents.*